United States Patent [19] [11] 3,956,747
Leypold et al. [45] May 11, 1976

[54] RADAR SYSTEM COMPRISING A PRIMARY RADAR DEVICE AND A SECONDARY RADAR DEVICE

[75] Inventors: Dieter Leypold; Bruno Maier, both of Munich, Germany

[73] Assignee: Siemens Aktiengesellschaft, Berlin & Munich, Germany

[22] Filed: Oct. 23, 1974

[21] Appl. No.: 517,221

[30] Foreign Application Priority Data
Oct. 25, 1973    Germany............................ 2353503

[52] U.S. Cl............................. 343/6 R; 343/6.5 LC
[51] Int. Cl.²........................................... G01S 9/56
[58] Field of Search............. 343/6 R, 6.5 R, 6.5 LC

[56] References Cited
UNITED STATES PATENTS
3,328,797   6/1967   Jorna et al. ...................... 343/6 R X
3,343,160   9/1967   Beals et al...................... 343/6 R X Primary Examiner—T. H. Tubbesing
Attorney, Agent, or Firm—Hill, Gross, Simpson, Van Santen, Steadman, Chiara & Simpson

[57] ABSTRACT

A radar arrangement utilizes a rotating or pivotal antenna lobe and a primary radar device operating with a doppler evaluation system and a secondary radar device equipped with a rotating or pivotal antenna lobe wherein a certain time period (processing time) expires between the scanning of a recognized target by the lobe of the primary radar antenna and the recognition of this target during the target evaluation in the receiver of the primary radar device. A storage device is provided which captures the azimuth angle position of a target recognized by the primary radar receiver and interrogation signals of the secondary radar transmitter are triggered with the help of a control means associated with the storage device for a certain interrogation range only when the antenna lobe of the secondary radar device repeatedly approaches the target. The interrogation range is selected sufficiently large that a number of answer signals is triggered which suffices for the desired reply probability.

15 Claims, 7 Drawing Figures

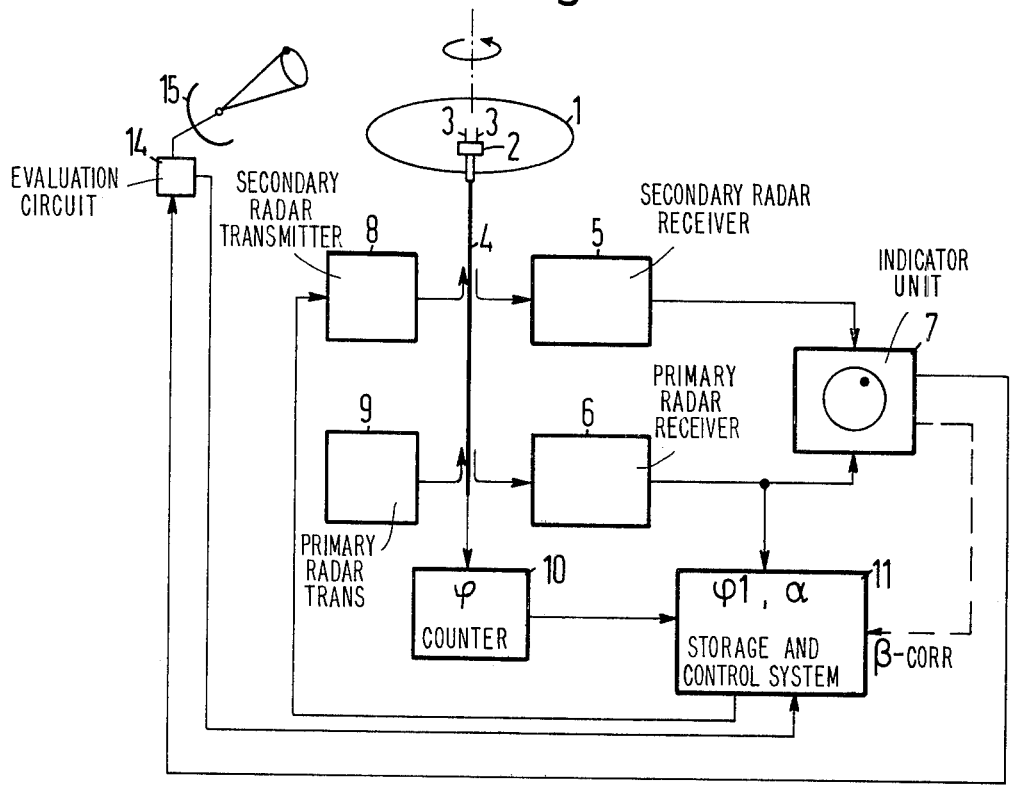
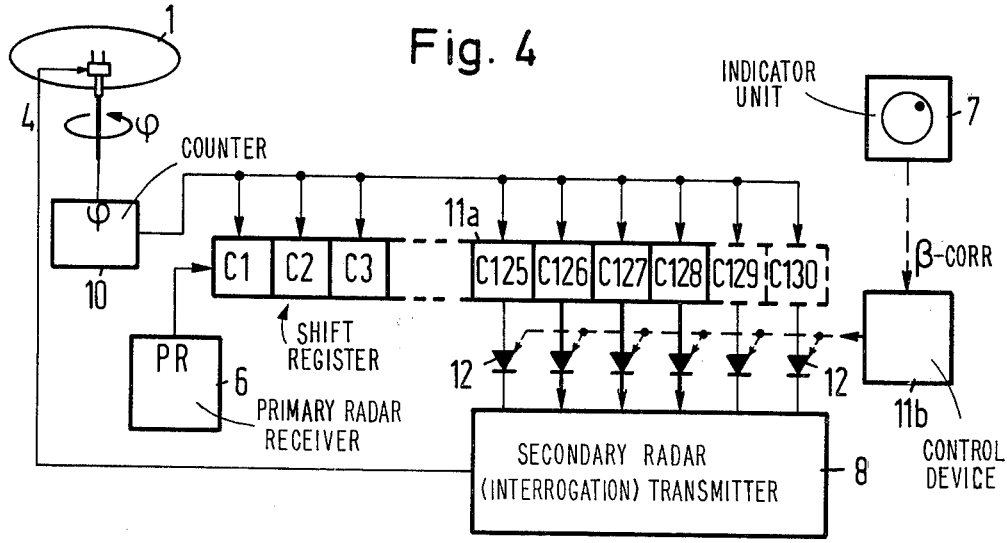

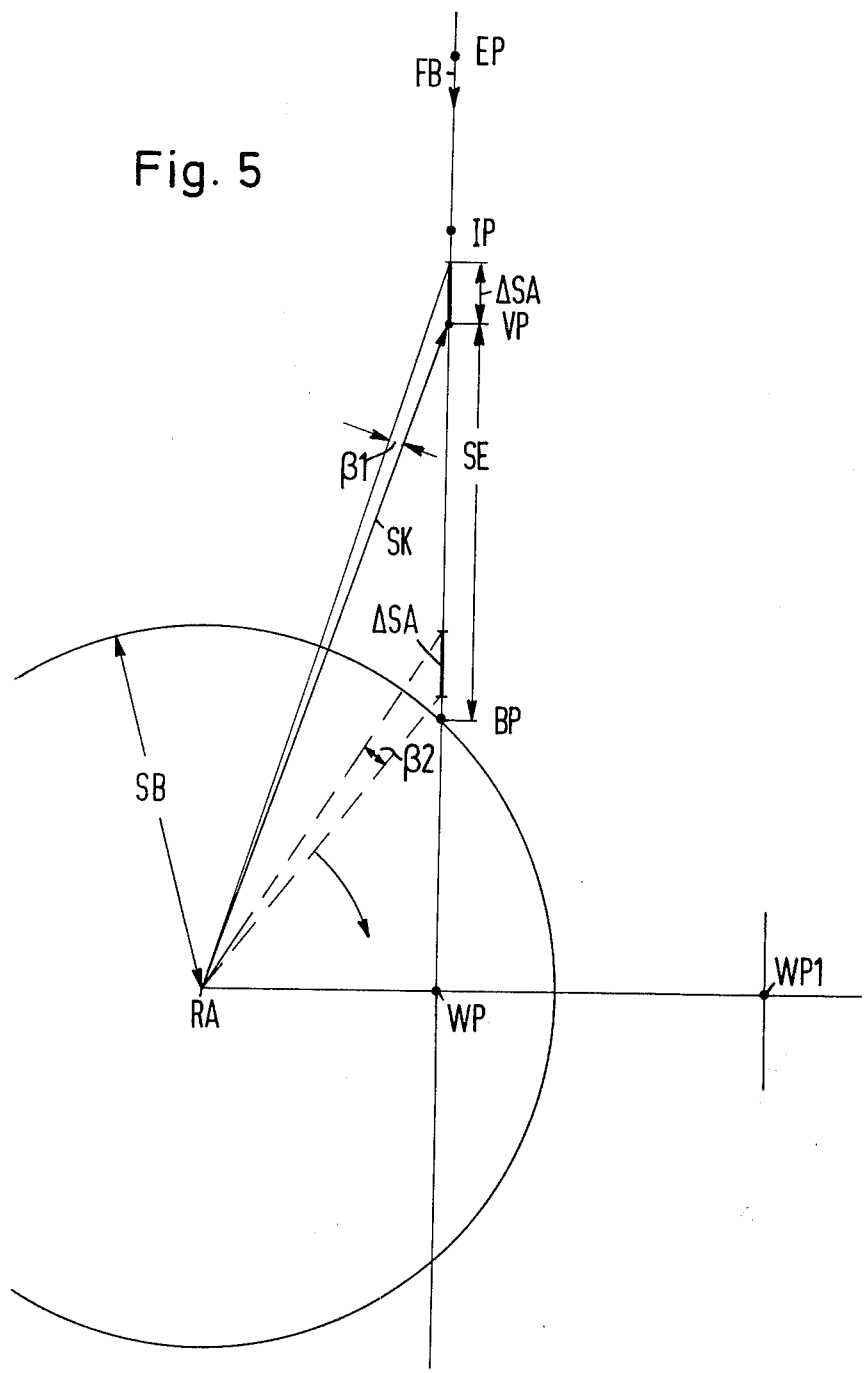

RADAR SYSTEM COMPRISING A PRIMARY RADAR DEVICE AND A SECONDARY RADAR DEVICE

BACKGROUND OF THE INVENTION

1. Field of the Invention

The invention relates to a radar system which utilizes a rotating or pivotal antenna lobe and a primary radar device operating with doppler evaluation and a secondary radar device equipped with a rotating or pivotal small antenna lobe, and more particularly to such a system wherein a certain time period expires between the scanning of the recorded target by the lobe of the primary radar antenna and the recognition of the target during target evaluation in the receiver of the primary radar device.

2. Description of the Prior Art

It is common practice in secondary radar devices, within the framework of the air space control and air traffic control, to transmit interrogation signals consecutively with a fixed interrogation frequency. In the case of cooperation with primary radar devices, it is furthermore known to provide a lead time (pre-trigger time) and therefore guarantee that the responses from a transponder and the echo signals of the primary radar device are provided for processing approximately at the same time. In this connection see the book "Secondary Radar," Peter Honold, Siemens Aktiengesellschaft, Berlin and Munich, (1971) Pages 35–36. The antennae of both systems are always equally directed and the interrogation signals are transmitted independently of whether targets have been scanned by the primary radar. Therefore, the work load in the radio space is often undesirably increased, and, due to the different ranges of primary radar and secondary radar, reply signals are also triggered by targets which are not of interest. This causes an unnecessary load on the transponders and the secondary radar receivers.

The German Letters Pat. No. 1,263,872, discloses an air control system wherein a certain time section is assigned to each airplane in such a way that each airplane receives interrogation signals only in the time section associated therewith, and transmits reply signals during this time. Such methods result in an essential decrease in the number of reply signals, since answers are not triggered continuously, but only on a section basis. However, such systems have the drawback that clocks of extreme accuracy are required for controlling the transponders. The number of the interrogation signals and thus the radio-space load remains the same.

SUMMARY OF THE INVENTION

The invention is based on the object of providing a way which offers the possibility of maintaining the radio-space load as small as possible, in the case of secondary radar devices cooperating with primary radar devices, and thereby guarantee a target interrogation in the required scope.

According to the invention, which relates to a radio arrangement of the type initially mentioned above, this object is achieved in such a way that a storage device is provided which fixes the azimuth angle position of a target acanned by the primary radar receiver, and that interrogation signals of the secondary radar transmitter are triggered with the help of control means associated with this storage device, for a certain interrogation area, when the antenna lobe of the secondary radar device repeatedly approaches the scanned target.

In the case of such arrangements, target interrogations in the required dimension can be obtained even in the case of primary radar antennas and secondary radar antennas which rotate very fast, as well as with very small antenna lobes, without the requirement of an uninterrupted transmission of interrogation signals into such directions where no targets are present. The radio space load can therefore be maintained very small.

The invention is of particular importance for all around radar devices for air space control. Such devices may be utilized with preference for the control of air space in view of friend-foe identification (IFF), in addition to the tasks provided in air control.

BRIEF DESCRIPTION OF THE DRAWINGS

Other objects, features and advantages of the invention, its organization, construction and operation will be best understood from the following detailed description taken in conjunction with the accompanying drawings, on which:

FIG. 3 is a block diagram representation of a radar arrangement constructed in accordance with the invention;

FIG. 4 is a schematic block diagram of the individual features of a shift register for the angle control for the interrogation signals; and FIG. 5 graphically illustrates the individual features of an air path with respect to a radar system having target tracking radar.

DESCRIPTION OF THE PREFERRED EMBODIMENTS

Figure 1:
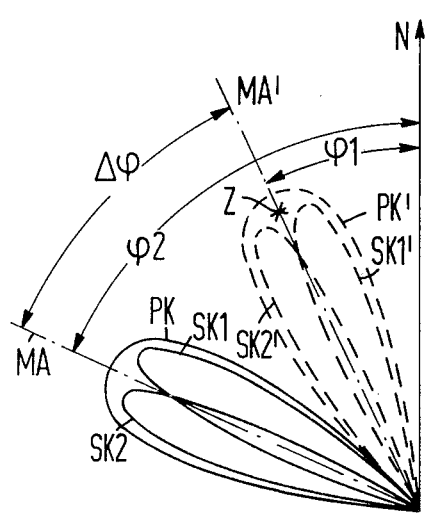
FIG. 1 is a radiation diagram showing radiation in two different instances.

Referring to FIG. 1, a reference direction, for example the direction north, of a control area has been denoted N and the antenna lobe of a primary radar device is referenced PK. The antenna lobe of a secondary radar device, pointing in the same direction, is formed of two partially overlapping radiation lobes SK1 and SK2. In this manner, various narrow interrogation ranges can be realized for the secondary radar devices, so that reply signals are triggered only within a certain angular range. Further individual features of these prior art possibilities of the application of narrow interrogation radiation lobes, as a background for better understanding of the invention, may be obtained by reference to the aforementioned book by Honold, Pages 52 and 53. According to these techniques, monopulse antennas are preferably used in the art.

In the case of radiation lobes, (radiation diagrams) PK, SK1, SK2, the center axis MA (dash-dot-dash line) illustrates the azimuth angle $\phi$ 2, which is taken with respect to north N. For this purpose, a counter-clockwise rotation direction is assumed. In addition to the preferred technique of rotating radiation, the scanning of the sector-shaped ranges can be carried out in the sense of the invention.

The center axis MA' of the radiation lobes pointed in the direction of the angle $\phi$1, in a position assumed at some previous time (broken line radiation lobes PK', SK1', SK2') is illustrated. If a new target has been flown into the controlled space, for example an airplane, then the primary radar device will require a certain time (processing time) until the received echo signals cause a target indication. This time is primarily taken by the tuning time of doppler filters of the primary radar device, as well as by the time required for exceeding certain threshold values. This processing time can be determined for each primary radar device, and we are here concerned with a fixed value within a given system.

It is assumed in the following example that the radiation lobes PK, SK1 and SK2 of the primary radar and secondary radar antennas point directly into the direction $\phi 2$ when the target Z has been recognized as such from the azimuth position $\phi 1$. If interrogation signals were transmitted in this direction of the antenna lobes SK1 and SK2, said signals would not be received by the target Z due to the small width of the radiation lobes SK1 and SK2, and would therefore not be able to trigger reply signals. The interrogation signals would have to be continued practically over the entire rotation range until reply signals would be triggered only during the next target scanning. This would cause the occurrence of a superfluous radio space load if only one or a few targets are to be interrogated. This increased radio space load cause unnecessary reply signals in the case of intrinsic reply devices, which are further remote, or an overload, respectively, and it offers the possiblility to an enemy of listening to interrogations for a fairly long period of time.

The relation $t = \Delta\phi T/360°$ holds true in the case of a rotating time T of the antenna lobes between the processing time of the primary radar device $\Delta t$ until a target indication and the angle change $\Delta\phi$, which occurred in the meantime.

Without considering marginal conditions and in the case of the simplified interrogation required for only one individual interrogation required for an identification, the first interrogation of the target Z would have to be triggered after an almost complete rotation in a position corresponding to the angle $\phi 1$. Individual features with respect to the question of the reply probability which is important in this connection are known through the aforementioned book of Honold, Pages 63–68. In practice, a larger interrogation range is required for obtaining a safe identification, which, however, must always only be positioned in a narrow range on both sides of the target Z, as can be seen in FIG. 2. Here, the angle sector WS1 (center axis MA1) of a width $\gamma$ is indicated for the target Z of FIG. 1, wherein interrogation signals are transmitted due to the radiation lobes SK1 and SK2, which may trigger reply signals. This angular sector WS1 illustrates the position of the effective width of the antenna lobe of the interrogation antenna at the beginning of the interrogation process. When the radiation has reached the position indicated by the angle sector WS2 (center axis MA2) the transmission of interrogation signals can be terminated. The effective interrogation range has, therefore, a width of $\alpha$. It starts at $\phi 1 - \alpha/2$ and ends at $\phi 1 + \alpha/2$. The interrogation range $\alpha$ is advantageously selected equally large or larger than the effective width $\gamma$ of the interrogation lobe.

When dimensioning the interrogation range $\alpha$, it must always be considered that the target Z may have carried out a certain movement after its scanning by the primary radar until the interrogation, so that additional contemplations must be considered.

Figure 2A:
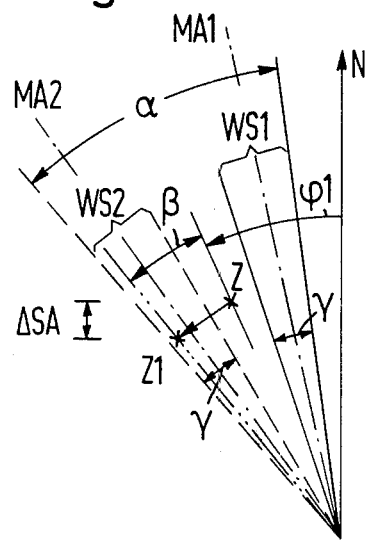
FIGS. 2a, 2b and 2c schematically represent interrogation ranges.
Figure 2B:
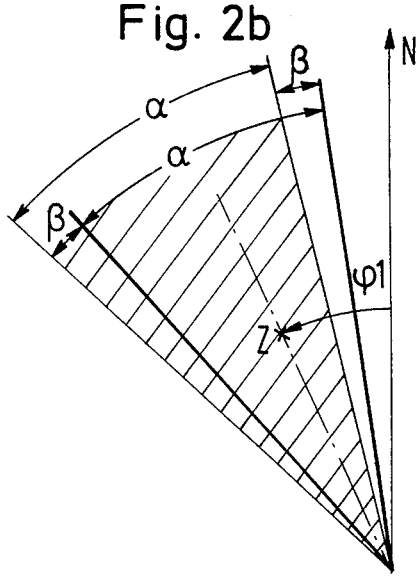
Figure 2C:
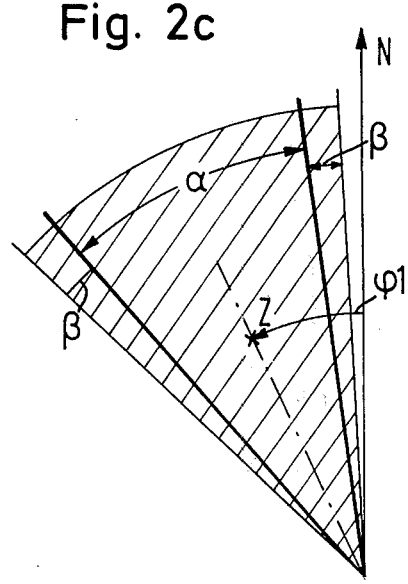

In order to explain these connections, an example has been illustrated as a supplement in FIG. 2a wherein the target Z has covered a certain path after its first recognition within the antenna rotation, whereby the radial portion of this path has been denoted by $\Delta SA$, and is thus positioned at the place referenced Z1. If the first interrogation signals are transmitted in this case (counterclockwise antenna rotation) when the interrogation lobe has the position represented by the angle section WS1, then the target Z1 (since it has moved from the sector in a tangential direction with respect to the target position Z) cannot emit any replies in the case of correspondingly narrow antenna diagrams. In this position it cannot be reached by interrogation signals any longer. It is true that replies are triggered later, during the course of the rotation, in the range of the angular sector WS2, when the target is in the position Z1. The number of these replies, however, does not obtain the value which would have been emitted by the target Z in the case of a full shifting of the angle sector WS1 into the position of the angle sector WS2. In that case, for example, ten consecutive interrogation signals are required for a safe friend-foe identification, and a fixed target Z would receive these ten interrogation signals during the shifting of the angular sector WS1 into the position of the angular sector WS2, and would emit ten correct reply signals.

In the position Z1 of the target, however, fewer, for example only one, interrogation (interrogations) would be received by the answer device. However, one individual reply does not suffice for a safe identification, in most cases. In addition, the danger is great that an answer might not be carried out in an answer device, due to other influences, and therefore no answer at all would occur in this example.

If, therefore, the interrogation ranges or interrogation lobes of the secondary radar devices are so narrow, and the target speed in the tangential direction is so great, that the target position, which has been changed from one rotation to the other at the value $\Delta SA$, adversely influences the answer probability, then it would be advantageous to provide corresponding measures for a correction of the width of the interrogation range which is provided for the transmission of interrogations. In the present example, the correction value over which the azimuth angle $\phi 1$ would have to be changed due to the movement of the target Z into the position Z1, is denoted by the reference $\beta$. The entire interrogation range $\alpha$ would therefore have to be shifted counterclockwise by the amount $\beta$ (corresponding to the tangential movement direction of the target). Then, the same number of interrogations results as in the case of a target position which has not changed in its angle, for example, in the case of a movement only in the radial direction. When the speed, the distance, and the movement direction of a target are known, the value of $\beta$ can be obtained for an antenna rotation, and the interrogation range can be shifted by the amount $\beta$. In this case, which has been indicated by hatched lines in FIG. 2b, the width of the interrogation range remains $\alpha$, without change, while a certain amount of work must be carried out for obtaining the value of $\beta$.

However, it is alos possible, and sufficient in many cases, to obtain a maximum value for the correction angle $\beta$ on the basis of general considerations for a certain radar device, and for certain maximum anticipated target speeds, and to include this into the determination of the position of the interrogation range in such a way that the initial interrogation range is increased by the angle $\beta$ on both sides. An example of this is illustrated by the hatching in FIG. 2c. The entire interrogation range is now $\alpha + 2\beta$. However, it is also possible, if the movement direction is known, to carry out the widening only on one side to obtain $\alpha + \beta$. The first merely presumes a correction of the angle values which is initially carried out without requiring particular target dependent steps. Therefore the cost for widening the ranges can be lowered.

If a certain tangential target speed has a base (as a maximum value) then the angle $\alpha$ can be considered distance dependent. Attention is invited that when the distance range which is covered by the primary radar device is covered, subdivided into $n$ distance ranges, and when one proceeds from a certain flight speed, then it is possible to calculate $n$ angles $\beta 1$ through $\beta n$. The correction of the width of the interrogation signals can therefore be controlled in a simple manner dependent upon target distance, while $\beta$ is a function of the distance. This measure is particularly simple in the case of primary radar devices, since the distance measurement is effected anyway with a relatively high speed and thus is immediately available for determining the corresponding correction angle $\beta 1$ through $\beta n$.

In FIG. 3, the construction of a radar arrangement is represented, which comprises a primary radar device and a secondary radar device. The arrangement comprises a reflector 1 of a radar antenna, the active transmission arrangement 2 for the primary radar device, for example a horn radiator, and the transmission arrangement 3 for the secondary radar device, for example in the form of individual dipoles. There is therefore an integrated antenna system, i.e. the transmitter arrangements 2 and 3 of the primary radar and the secondary device are fixedly associated with one another and have a common reflector 1. Accordingly, both antenna systems are also mechanically moved in the same manner around a common rotary axis about the azimuth angle $\phi$.

The connection between the antenna arrangement and the radar device systems is effected by way of a conductor system 4 which is here schematically illustrated and which is to contain both the high frequency feed lines and the transmission lines for the angle information from the antenna to the devices. The construction of these conductor systems is well known in the art and will not be further dealt with here. A receiver 5 of the secondary radar device is coupled to the conductor system 4, as well as the receiver 6 for the primary radar device. Both receivers 5 and 6 are associated with a common evaluation circuit and/or indicator circuit 7, which is here indicated as a picture screen for simplicity. In place of a picture screen, digital radar data evaluation systems, such as computers or the like may be employed.

The secondary radar device futher comprises a transmitter 8 and the primary radar device further comprises a transmitter 9. Both transmission systems are coupled to the conductor system 4 in a manner which is well known in the art.

A counter 10 for the azimuth angle $\phi$ is controlled by the conductor system 4, such that the transmission of the target angle information of the antenna may be effected in a manner which is also well known in the art, for example by resolvers or coded angular discs. The counter 10 indicates the respective position of the antenna by way of its count state, particularly the directioning of the axis of the radiation lobes which are illustrated in FIG. 1 at MA. The continuous azimuth angle information is fed from the counter 10 to a storage and control device 11 which is also connected with the output of the primary radar receiver 6. Upon the emission of an echo signal of a moved target at the output of the primary radar device 6, a certain azimuth angel $\phi 2$ (the processing time $\Delta t$ for the primary radar echo signals has already expired) a control signal from the primary radar receiver 6 will reach the storage and control system 11, which proceeding from the angle $\phi 2$, determines and controls the angle $\phi 1$ under which the target Z in accordance with FIG. 1 was actually scanned by the primary radar device, i.e. it corrects the instantaneous angle position $\phi 2$ in accordance with FIG. 1 over the angle $\Delta \phi$ corresponding to the processing time $\Delta t$, for the primary radar echo signals.

It is also possible to automatically advance the counter 10 by the amount $\Delta \phi$, in advance, so that an output signal of the receiver 6 can mark the correct angle value $\phi 1$ directly.

In addition, this storage and control device 11 contains the information concerning the width $\alpha$ of the interrogation range. If required, the specific target corrections over the angle $\beta$ can also be fed into the device. It is indicated by the conductor extending from the evaluation and indicator unit, for example the picture screen 7, toward the storage and control system 11, since the target distance and/or the target speed is already provided as information at the evaluation and indicator unit.

As soon as the antenna again approaches the scanned target Z during the next rotation (i.e. after completing a rotation), (in the case of correction it approaches Z1, respectively), the secondary radar transmitter 8 is triggered by the storage and control device 11 by way of a comparison between the given value $\phi$ and the stored value $\phi 1$, while considering the width of the interrogation range $\alpha$, and the interrogation signals are transmitted via the transmitter arrangement 3 into only that interrogation range $\alpha$ wherein the target Z or Z1, respectively, is positioned, which was previously scanned by the primary radar.

After its target has been scanned by an antenna arrangement 1, 2, 3, which works about or in a sector range, a target tracking antenna 15 can be turned on to follow the moved target with a high degree of accuracy. The switching on of the target tracking antenna can be effected automatically, or by operating personnel at the evaluation and indicator unit 7. The evaluation circuit of the target tracking radar is referenced 14. Since the actual azimuth $\phi 1$ of the target is continuously determined with great accuracy during target tracking, the control of the interrogation of the tracked target can advantageously only be effected by the target tracking radar. Therefore, one can operate with the narrow interrogation range $\alpha$, and angle corrections $\beta$ are no longer required. The angle information concerning the accurate target position is advantageously processed from the receiver 14 of the target tracking radar toward the storage and control device 11, which, in turn, causes triggering of the interrogation transmitter 8.

An exemplary embodiment is illustrated in FIG. 4 showing how the storage of the angle information and the control of the interrogation signals can be effected. The counter 10, processing the angle of rotation $\phi$ of the antenna arrangement, produces timing pulses, whereby a full rotation is quantized into corresponding many smaller angular sections. It is assumed, as an example, that the quantizing is effected upon 128 angular sections, so that each angular section includes 360°/128 = 2.8°. In the case of a complete rotation, 128 timing pulses will be produced successively in this illustrative example of the angle counter 10. These timing pulses are supplied to a shift register 11a which contains at least 128 storage spaces C1 through C128 and which forms a part of the storage and control device 11 illustrated in FIG. 3. In some cases, it may be advantageous to provide more storage locations. In the present example, two such storage locations C129 and C130 have been illustrated. The MTT video signal produced by the output of the primary radar receiver 6 when a moved target is scanned, is applied to the storage location C1 of the shift register 11a, and is written into this storage location as a binary "1" during the subsequent counter timing pulse. During the next angle-count pulse, the storage location C2 will be occupied, during the third angle pulse it will be the storage location C3, etc. After a complete rotation, the binary 1 is fully shifted through and is thus stored in the location C128.

A certain angle range may be characterized depending on the storage location where taps are to be made as an output take off. In the present example, the heavy lines extending from the storage location C126, C127 and C128 indicate that the stored or passing information, respectively, is read out here. This reading out process, compared with the storing process from the primary radar receiver 6 is effected over an angular position of $360° - 3 \times 2.8 = 351.6°$ in the case of the storage position C126, over $360° - 2 \times 2.8 = 354.4°$ in the case of the storage position C127, and over $360° - 2.8 = 357.2°$ in the case of the storage position C128. Therefore, an angular range is fixed, extending from a 351.6° through 360°. The angle $\phi_1$ (FIG. 1) which indicates the center of the scanned target Z, is thus positioned in the center at 355.8°. The secondary radar transmitter 8 would therefore be controlled in the angular range between 351.6° and 360°, and would transmit interrogations in that range.

When the storage position C125 is also provided with an output and connected thereby to the secondary radar transmitter 8, then the angle range occupied with interrogation signals would extend from 349.2° through 360°.

If, in addition, a specific target distance and/or speed dependent correction is to be effected over the angle $\beta$, as has been explained with the help of FIG. 2, then switches may be inserted into the output taps of the different storage locations, for example in the form of switch diodes 12, which are actuated by the control system 11b. The information concerning the magnitude of the angle $\beta$ as previously explained, depends on the target distance and/or the target speed. Both pieces of information may be obtained in a manner which is well known in the art from the indicator and evaluation system, for example upon the picture screen 7, and may be supplied to the control system 11b. This control system opens the switch diodes 12 of those memory positions which result in the desired angle value. The emission of the switch orders proceeding from the control device 11b is indicated for the switch diodes 12 by broken lines in FIG. 4.

The shift register 11a, as illustrated in FIG. 4, can store the desired angle information not only for an individual target but for a number of targets. If, for example, a second target is positioned $10 \times 2.8° = 28°$ behind a first target, then the first target would be positioned at the storage space C11 when the information concerning the second target is stored into the storage position C1. The reading of the angular target data, in the case of the memory positions C126 through C128 would be effected in a correspondingly shifted manneer.

A possibility of lowering the number of output taps at the storage positions which are to be read is provided whereby several storage positions at the input of the shift register 11a are occupied one after the other, or simultaneously for one individual target. If, for example, the storage positions C1, C2 and C3 are occupied for a target, three output signals will successively appear in the case of only one output tap, for example at the storage location C127, and the angular range of $3 \times 2.8° = 8.4°$ is therefore characterized which extends from 357.2° through 348.8°. If several output taps are employed, and the MTI video signal is written-in in multiple, then the interrogation range may be broadened, corresponding to the value of the product of the occupied storage locations and output taps. In the case of three initially occupied storage locations and two output taps at the end of the shift register, the angle range is $3 \times 2.8° = 16.8°$ wide.

The mthod illustrated by the invention is of particular importance in the case of cooperation with target tracking radar devices. In this case, as quick a recognition of targets as possible is particularly required, as well as a safe friend-foe identification.

Reference is now taken to FIG. 5, for an explanation of the essential points of the invention in this connection. In FIG. 5, the position of the radar device (consisting of primary radar, secondary radar and target tracking radar) is denoted by the reference RA. The weapon, which is coupled with the target tracking radar is to have a fighting range (range of efficiency) SB of, for example, several kilometers. The boundary between this fighting range and the area there beyond is indicated by the a circle Lawing the radius SB. The line FB indicates the flight path of an observed moved target, for example an airplane, whereby it is assumed for purpose of simplicity that one is concerned with a straight flight path. A number of points are indicated on this flight path which have the following importance:

EP = the point where the moving target is first recognized by the primary radar device of the radar system RA;

IP = the point where the friend-foe identification has been clearly completed;

VP = the point, whereat the latest, switching of the target tracking radar onto a moved target must be effected, so that when the fighting range is reached, the aircraft can be immediately attacked;

SK = the critical distance where the tracking by the tracking radar must begin when the target recognition is to be completed after the reaction time at the point BP;

SE = the path during the reaction time;

BP = the point where the fighting range is reached; and

WP = the point where the moved target reaches its greatest proximity to the radar system RA and starts removing itself from the system again.

If it is assumed that the path per antenna rotation amounts to $\Delta SA$, then a maximum of $\beta_1$ results during an interrogation ahead of the point VP, and the azimuth angle of a target may change at this angle $\beta_1$ from one rotation of the antenna to the next. In the case of a target recognition further beyond the point VP, the corresponding angle β would be smaller than β1, so that β1 can be considered a binary value. In the case of the recognition of the targets beyond the point VP, a correction of the position of the interrogation range over a maximum of β1 might possibly suffice in order to guarantee a safe recognition by interrogation signals under all circumstances. Here, the considerations made in connection with FIG. 2 hold true.

When an approaching target, for example a low-level airplane, is recognized essentially later, a much greater angle β will result. In the center part of the flight path FB, such an example has been illustrated, at the angle for the same path from ΔSA and has been referenced β2. Therefore, while one can possibly operate with a uniform angle β1 in the case of fairly remote flight objects, (beyond the point VP), a larger angle correction β2 is to be effected in the case of a first recognition of close targets, for example low-level airplanes, so that the interrogation range α has the correct space position for as complete an interrogation process as possible.

In addition, the angle β is also dependent on how far the changing point WP is remote from the radar system RA. In the case of a greater approach toward the radar system RA, the angle β becomes smaller, and also becomes larger in the case of a greater removal from the radar system RA.

However, it must thereby be taken into account that targets which fly far beyond the fighting range SB, passing the radar system RA (for example indicated by the changing point WP1) do not have to be registered, since they cannot be fought with the weapon associated with this radar system, i.e. they are beyond the range of the weapon.

As soon as a moved target has been recognized safely as a "friend," after a sufficient number of interrogations, interrogation of this target is no longer necessary. It is therefore advantageous to erase the associated angle φ1 in the storage and control system 11 of FIG. 3, proceeding from the evaluation and indicator system 7, after a clear friend identification, and to therefore avoid further interrogations in this direction.

Conversely, in the case of a first recognition of a target at a very small distance, for example between the point VP and the fighting range SB, it is advantageous to immediately switch the fire control radar immediately toward the moved target, even if it is not clearly indicated whether one is concerned with a friend or an enemy target. It is usually possible to complete the friend-foe identification with the help of the secondary radar device before the action time corresponding to the path SE in accordance with FIG. 5 has been completed, and depending on the outcome of this identification, the sighting of the moved target is started (enemy identification) or not effected (friend identification). The triggering of the interrogation signals at the correct angle φ1 is also advantageously directly effected by the fire control radar.

Although we have described our invention by reference to particular illustrative embodiments thereof, many changes and modifications of the invention may become apparent to those skilled in the art without departing from the spirit and scope of the invention. We therefore intend to include within the patent warrented hereon all such changes and modifications as may reasonably and properly be included within the scope of our contribution of the art.

We claim:

1. In a radar system of the type including a rotating antenna, a primary radar comprising a primary radar transmitter and a primary radar receiver having a doppler evaluation device operating according to the doppler effect and a secondary radar including means for providing a rotating antenna lobe, and in which a processing time elapses between scanning of the target by the lobe of the primary radar and the recognition of the target during target evaluation in the receiver of the primary radar, the improvement comprising:
   a storage device connected to the primary radar receiver for storing azimuth angle data of a target; and
   a control device connected to said storage device and to the secondary radar for causing triggering of interrogation signals by the secondary radar for an interrogation range α only when the secondary radar lobe repeatedly approaches the target, said control device including means for triggering over the range α so that a large number of answer signals is triggered sufficient for a predetermined reply probability.

2. A radar system according to claim 1, wherein the interrogation range α is greater than the interrogation lobe.

3. A radar system according to claim claim comprising means for determining an azimuth angle correction value ββ for the interrogation range α.

4. A radar system according to claiim 1, comprising means for determining an azimuth angle correction value β for the tangential movement of the target from one antenna rotation to the next for increasing the interrogation range α at one side by the correction value β and decreasing the interrogation range α at the other side of the range α by the correction value β.

5. A radar system according to claim 1, comprising means for determining an azimuth angle correction value β for the tangential target movement from one antenna rotation to the next for increasing the interrogation range only at one side of the interrogation range α.

6. A radar system according to claim 1, comprising means for determining an azimuth angle correction value β for the tangential movement of the target from one antenna rotation to the next for increasing the interrogation range α on each side of the interrogation range α.

7. A radar system according to claim 1, comprising means for determining a respective target angle change of a moved target within an antenna rotation independence on the distance of the target and providing the same as a correction value β for the interrogation range α.

8. A radar system according to claim 1, comprising a counter for recording antenna movement to continuously determine the angular position φ of the antenna, and means for triggering interrogation signals at the proper angle during the successive target scan in response to receipt of a target echo by the primary radar.

9. A radar system according to claim 8, comprising a shift register, said counter serving as a timing generator for such shift register, said shift register receiving a signal in its first storage position in response to receipt of an output signal from said primary radar receiver, said shift register including output taps at certain ones of its storage positions to cause triggering of interrogation signals at the correct target angle.

10. A radar system according to claim 8, comprising means for storing said output signal from the primary radar of one individual target in the first several storage positions of said shift register.

11. A radar system according to claim 8, comprising selectively operable switching means connected to each of said output taps of said shift register, the number of switching means being activated fixing the interrogation angle $\alpha$.

12. A radar system according to claim 8, comprising selectively operable switching means connected to each of said output taps of said shift register, a first number of such switching means being activated fixing the interrogation range $\alpha$, and an additional number of said switching means being activated fixing the correction value $\beta$.

13. A radar system according to claim 1, comprising a common reflector for the primary and secondary radars, and respective exciter systems for transmission of primary and secondary signals.

14. A radar system according to claim 1, comprising a fire control radar connected to the primary radar and to the secondary radar, including a target tracking device responsive to start tracking upon receipt of signals from receiving data from the primary and secondary radars.

15. A radar system according to claim 14, comprising means responsive to switching on of the fire control radar to transfer the control of triggering of interrogation signals in the interrogation range and at the correct azimuth from the primary radar to the fire control radar.

* * * * *